United States Patent
Sarlioqlu et al.

(10) Patent No.: US 6,791,204 B2
(45) Date of Patent: Sep. 14, 2004

(54) TORQUE GENERATION FOR SALIENT-POLE SYNCHRONOUS MACHINE FOR START-UP OF A PRIME MOVER

(75) Inventors: Bulent Sarlioqlu, Torrance, CA (US); Colin E. Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 10/247,679

(22) Filed: Sep. 20, 2002

(65) Prior Publication Data

US 2004/0056487 A1 Mar. 25, 2004

(51) Int. Cl.[7] .................... F02C 6/00; F01D 15/10; F02N 11/00; H02P 9/00; H02K 23/52
(52) U.S. Cl. ..................... 290/52; 290/51; 290/48; 290/47
(58) Field of Search .................... 290/46–48, 51–52

(56) References Cited

U.S. PATENT DOCUMENTS

| | | | |
|---|---|---|---|
| 3,887,852 A | | 6/1975 | Fernandes et al. .......... 318/197 |
| 4,935,686 A | * | 6/1990 | Stacey .......................... 318/801 |
| 5,029,263 A | | 7/1991 | Rozman ........................ 318/714 |
| 5,428,275 A | | 6/1995 | Carr et al. .................... 318/146 |
| 5,428,283 A | * | 6/1995 | Kalman et al. ............... 318/729 |
| 5,493,195 A | * | 2/1996 | Heglund et al. ............. 318/701 |
| 5,495,127 A | * | 2/1996 | Aota et al. ..................... 290/31 |
| 5,568,034 A | * | 10/1996 | Huggett et al. .............. 318/802 |
| 5,656,911 A | | 8/1997 | Nakayama et al. .......... 318/718 |
| 5,689,165 A | * | 11/1997 | Jones et al. .................. 318/701 |
| 5,818,192 A | | 10/1998 | Nozari ........................... 318/609 |
| 5,844,385 A | * | 12/1998 | Jones et al. .................. 318/254 |
| 5,867,004 A | * | 2/1999 | Drager et al. ................ 318/701 |
| 5,877,606 A | | 3/1999 | Nozari ........................... 318/700 |
| 5,949,204 A | * | 9/1999 | Huggett et al. .............. 318/254 |
| 6,011,377 A | * | 1/2000 | Heglund et al. ............. 318/701 |
| 6,031,294 A | * | 2/2000 | Geis et al. ...................... 290/52 |
| 6,035,626 A | | 3/2000 | Wahl et al. .................. 60/39.02 |
| 6,069,808 A | * | 5/2000 | Panahi et al. .................. 363/98 |
| 6,169,334 B1 | * | 1/2001 | Edelman ........................ 290/52 |
| 6,201,715 B1 | * | 3/2001 | Huggett et al. ................ 363/48 |
| 6,265,786 B1 | * | 7/2001 | Bosley et al. .................. 290/52 |
| 6,281,596 B1 | * | 8/2001 | Gilbreth et al. ............... 290/52 |
| 6,288,515 B1 | | 9/2001 | Hiti et al. ...................... 318/722 |
| 6,301,136 B1 | * | 10/2001 | Huggett et al. ................ 363/95 |
| 6,316,920 B1 | * | 11/2001 | Huggett et al. .............. 323/207 |
| 6,325,142 B1 | * | 12/2001 | Bosley et al. .................. 166/53 |
| 6,329,798 B1 | * | 12/2001 | Huggett et al. .............. 323/207 |
| 6,355,987 B1 | * | 3/2002 | Bixel .............................. 290/52 |
| 6,359,412 B1 | * | 3/2002 | Heglund ...................... 318/701 |
| 6,362,590 B2 | | 3/2002 | Nozari ........................... 318/609 |
| 6,410,992 B1 | * | 6/2002 | Wall et al. ..................... 290/52 |
| 6,414,866 B2 | * | 7/2002 | Huggett et al. .............. 363/124 |
| 6,438,321 B1 | | 8/2002 | Lin .............................. 388/800 |
| 6,464,028 B1 | * | 10/2002 | Imani .......................... 180/65.2 |
| 6,583,995 B2 | * | 6/2003 | Kalman et al. ................ 363/35 |
| 6,640,196 B1 | * | 10/2003 | Unsworth et al. ........... 702/115 |
| 6,664,653 B1 | * | 12/2003 | Edelman ........................ 290/52 |
| 6,664,654 B2 | * | 12/2003 | Wall et al. ..................... 290/52 |
| 6,697,270 B1 | * | 2/2004 | Kalman et al. ................ 363/51 |
| 6,713,892 B2 | * | 3/2004 | Gilbreth et al. ............... 290/52 |
| 6,724,098 B2 | * | 4/2004 | Ortega et al. .................. 290/52 |
| 6,724,099 B2 | * | 4/2004 | Klaar ............................. 290/52 |
| 2002/0110007 A1 | | 8/2002 | Kalman et al. ................ 363/35 |

FOREIGN PATENT DOCUMENTS

EP          1115196 A2     7/2001

* cited by examiner

*Primary Examiner*—Nicholas Ponomarenko
*Assistant Examiner*—Pedro J. Cuevas
(74) *Attorney, Agent, or Firm*—Oral Caglar, Esq.

(57) ABSTRACT

A system and method to provide an improved power electronics starting system (100) in which starting torque is delivered by a salient pole synchronous machine (102), while associated power electronics (110) and (118) utilization is maximized by adjusting the Park vector of the armature (102A) phase current to remain in-phase with the Park vector of the armature (102A) terminal voltage, regardless of the level of saturation of the pole synchronous machine (102).

12 Claims, 4 Drawing Sheets

TORQUE GENERATION FOR SALIENT-POLE SYNCHRONOUS MACHINE FOR START-UP OF A PRIME MOVER

CROSS-REFERENCE TO RELATED APPLICATIONS

Related subject matter is disclosed in a U.S. patent application Ser. No. 10/247,615 of Sarlioglu et al. entitled "Electric Start For A Prime Mover", filed concurrently herewith and in a U.S. patent application Ser. No. 10/315,051 of Sarlioglu et al., entitled "A Method And System For Providing Single-Phase Excitation Techniques To A Start Exciter In A Generator System", the entire content of each being incorporated herein by reference.

FIELD OF THE INVENTION

The present invention relates to an improved system whereby the torque required to perform an electric start of a prime mover, such as a turbine engine, may be achieved with reduced current and reduced inverter power (kVA) rating, thereby reducing the cost, size and weight of the system. Specifically, the present invention provides an improved power electronics system in which starting torque is delivered by a salient pole synchronous machine while associated power electronics utilization is maximized by adjusting the Park vector of the armature phase current to remain in-phase with the Park vector of the armature terminal voltage within a synchronous machine.

BACKGROUND OF THE INVENTION

In a traditional system of starting a prime mover, such as a gas turbine engine, a starter motor is used to apply torque to the turbine engine's shaft for some period. As described in U.S. Pat. No. 6,035,626 issued to Wahl et al., the entire content of which being incorporated herein by reference, the gas turbine engine includes a compressor, a combustor, and a turbine. The compressor and the turbine are mounted for rotation on a shaft, which may also be used to drive other components, such as a gearbox and various accessories, such as an alternating current (AC) electric generator and lube pump.

As described in the Wahl Patent, as the shaft starts to rotate, air is inducted into the compressor, compressed and then discharged in the combustor. Concurrently, the engine's fuel control system feeds fuel into the combustor in accordance with a preprogrammed fuel schedule to precisely maintain the proper fuel to air ratio in the combustor. At a rotational speed of about 10 to 20 percent of the engine's operating speed, the conditions in the combustor become such that the fuel/air mixture can be ignited at a stage commonly known as "light-off". Should the fuel to air ratio be either too rich or too lean, light-off will not occur and the engine will experience a "hung start". After light-off the starter motor torque is augmented by torque from the engine's turbine. At about 50 percent of operating speed the starter motor is shut off. At this point, the engine is self-sustaining and accelerates itself to operating speed.

Typically, direct current (DC) motors are used as starter motors in such applications. However, as explained in the Wahl Patent, for a given power supply, DC motor torque-versus-speed characteristics are fixed. Consequently, a DC starter motor must be sized to produce starting torque under the worst condition with the greatest engine drag, which is typically a cold soaked engine. Such DC starter motors are of a type commonly referred to as brush-type motors, and have severe reliability problems due to the brush-commutator interface that can deteriorate rapidly due to high altitude starts. Further, the speed-torque profile of the motor is fixed and cannot be adjusted.

One solution to overcome the disadvantages associated with DC motors discussed in the Wahl Patent includes the use of the prime mover's AC generator as an AC starter motor. Generators, in combination with power converters, are commonly referred to as starter/generators (S/Gs). Furthermore, as pointed out in the Wahl Patent, the power converter can regulate the power consumption of the starter/generator from either a DC or AC source, therefore the converter can be controlled to provide any desired starting torque characteristic or torque-versus-speed profile. Such systems generally require the use of power inverters that control the current applied to the stator winding of the main generator in addition to a low power inverter that supplies single phase excitation to the exciter field.

As known to those skilled in the art, a starter/generator synchronous machine is doubly excited, with electrical energy supplied to both the field and armature windings. A DC voltage is typically applied to the field winding located on the rotor, and an AC current is applied to the armature winding located on the stator. Where current exists in each winding, a torque is produced resulting from the alignment of associated magnetic fields. Ideally, torque maximization for a synchronous machine can be achieved by having the armature current Park vector in-phase with the back-emf vector, which is located in the q-axis. Additional details regarding such torque control are discussed in U.S. Pat. No. 5,818,192 issued to Farhad Nozari, the entire content of which being incorporated herein by reference. The Nozari Patent discloses a method of control which serves to optimize a starter/generator synchronous machine used in starter applications. The armature current vector of the synchronous machine in the Nozari Patent is controlled to remain in-phase with the back-emf vector, which optimizes the machine, but can not consistently optimize the control electronics, such as the synchronous machine inverter. Optimization of the electronics, primarily the inverter, is critical, as the cost per kVA rating is many times greater than for the synchronous machine.

In applications such as turbine starting, whether for the main engine or APU start, a minimum torque must be provided at or about "light off" of the engine in order to continue acceleration of the engine. This minimum torque must be provided by a vector product of main field flux and stator current vector. Optimizing the rating of the two inverters (main and field) would minimize the cost and weight of the combination. Saturation of the machine plays an important role in determining this optimum, since once the machine is saturated, further increase in field current does not increase the field flux appreciably.

Accordingly, a need exists for a starting system using an attached synchronous machine to accelerate a prime mover, such as a gas turbine engine, where control electronics are optimized while maintaining torque levels at or near maximum values by adjusting the armature current Park vector of the synchronous machine, particularly when the machine is saturated.

SUMMARY OF THE PREFERRED EMBODIMENTS

An object of the present invention is to provide torque, generated by a synchronous machine, for the start-up of an attached prime mover, such as a gas turbine engine.

Another object of the present invention is to provide and optimize a control system to direct the operation of the synchronous machine in the starting system.

Still another object of the present invention is to achieve torque levels at or near maximum values while maintaining optimization of the synchronous machine control electronics.

Still another object of the present invention is to achieve significant cost savings by optimizing control electronics used during start-up of an attached prime mover.

These and other objects are substantially achieved by providing a system and method for controlling the armature current of a starter/generator (S/G) during turbine engine start-up applications. The system and method controls the armature current Park vector of the S/G to remain in-phase the terminal voltage Park vector of the system thereby maintaining equal active power and apparent power levels, and maximizing the kVA rating of the electronics, primarily the S/G inverter. This strategy enables both the reluctance and reaction torque of the machine to be utilized, thereby reducing the required kVA rating of the inverters used for starting.

BRIEF DESCRIPTION OF THE DRAWINGS

These and other objects, advantages and novel features of the invention will be more readily appreciated from the following detailed description when read in conjunction with the accompanying drawings, in which.

In the drawing figures, it will be understood that like numerals refer to like structures.

DETAILED DESCRIPTION OF THE PREFERRED EMBODIMENTS

The present invention described below systematically maintains the armature current Park vector of the S/G to remain in-phase the terminal voltage Park vector of the system, optimizing control electronics by maintaining an active power that is equal to apparent power. By maintaining this strategy during the start of the turbine, both reluctance and reaction torque are utilized to minimize the cost and size of the inverters.

By comparison, where a phase angle exists between the terminal voltage Park vector and armature current Park vector, the apparent power (i.e. kVA rating) of the control electronics will be reduced resulting in poor inverter utilization. Park vectors inherently contain information on both the instantaneous magnitudes and the phase relationships of three phase rotating fields with respect to a reference coordinate system. A Park vector in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines", Elsevier Science Publishing Co., and in U.S. Pat. No. 6,301,136 issued to Huggett et al., the entire content of each being incorporated herein by reference.

Figure 1:
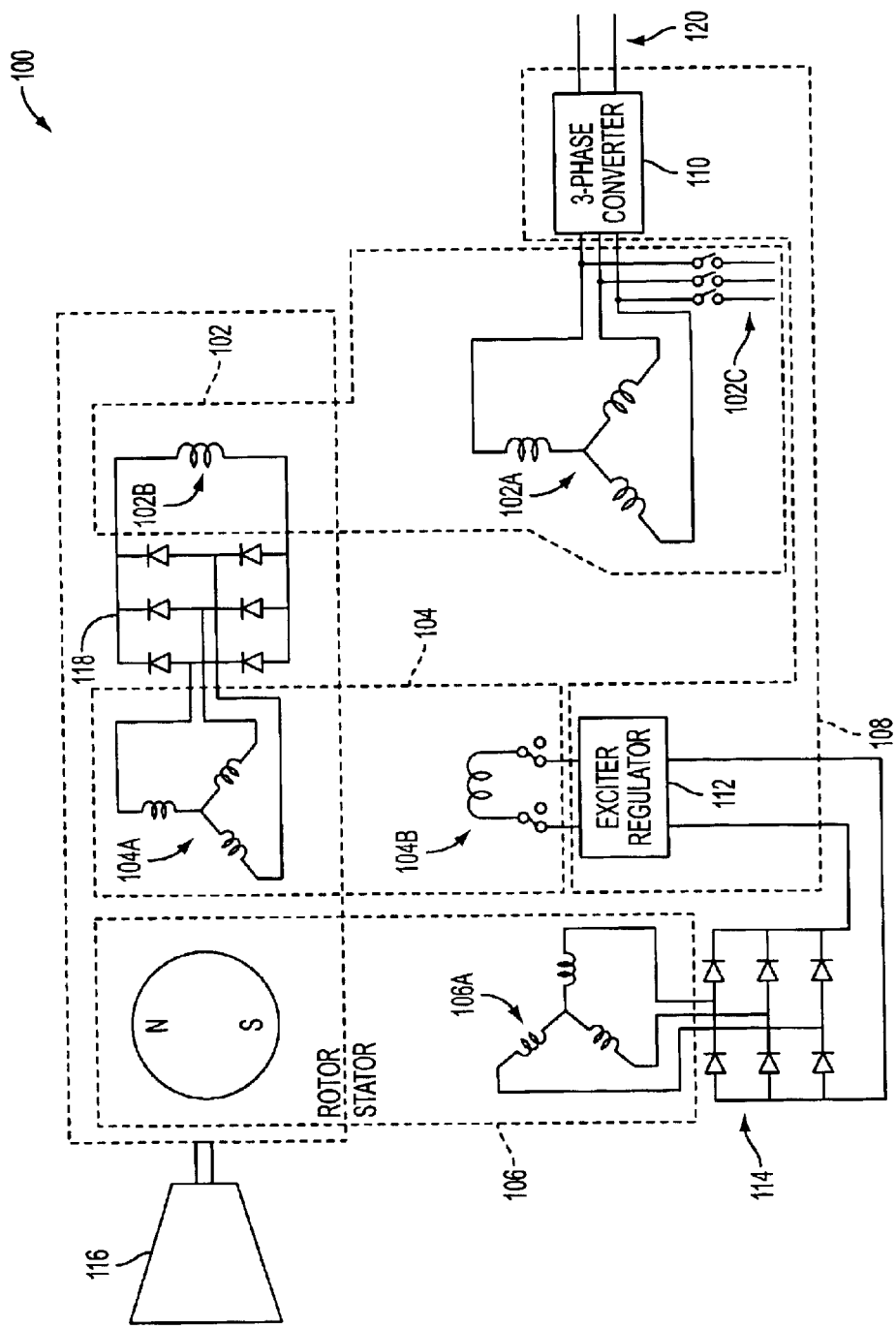
FIG. 1 is a block diagram illustrating an example of a starting system in accordance with an embodiment of the present invention.

A block diagram illustrating an example of a system (100) for generating and motoring a prime mover, such as a gas turbine engine, is shown in FIG. 1 in accordance with an embodiment of the present invention. The system (100) comprises three electrical machines (102), (104) and (106), a prime mover (116), such as gas turbine, and an active and passive power electronics circuit (108). The three electrical machines typically consist of a permanent magnet (PM) generator (106), an exciter salient-pole synchronous machine (104), and main salient-pole synchronous machine (102). The system (100) preferably includes the main machine, or starter/generator (S/G) (102), exciter (104), and PM generator (106) arranged to allow multiple modes of operation, as described below. The system also includes a plural phase inverter (110), a first plural phase rectifier (114), a second plural phase rectifier (118) and an exciter regulator (112), where the plural phase inverter (110) and the exciter regulator (112) operate in cooperation as the active and passive power electronics circuit (108).

The first plural phase rectifier (114) is electrically coupled to the armature winding (106A) of the PM generator (106) and to the field winding (104B) of exciter (104) via an exciter regulator (112). The second plural phase rectifier (118) is located on the rotor of the main machine (102) and is electrically coupled to the armature winding (104A) of the exciter (104) and to the field winding (102B) of the main machine (102). The plural phase inverter (110) is electrically coupled to the armature winding (102A) of the main machine (102), AC load lines (102C) and a DC bus (120). The kVA rating of the inverter (110) is selected to meet the needs of the main machine (102). As pointed out above, improving inverter utilization is very important in control system design, both economically and operationally. Excess inverter capacity is not only expensive to purchase, but also to operate, requiring more space and having higher weight and switching losses.

Figure 2:
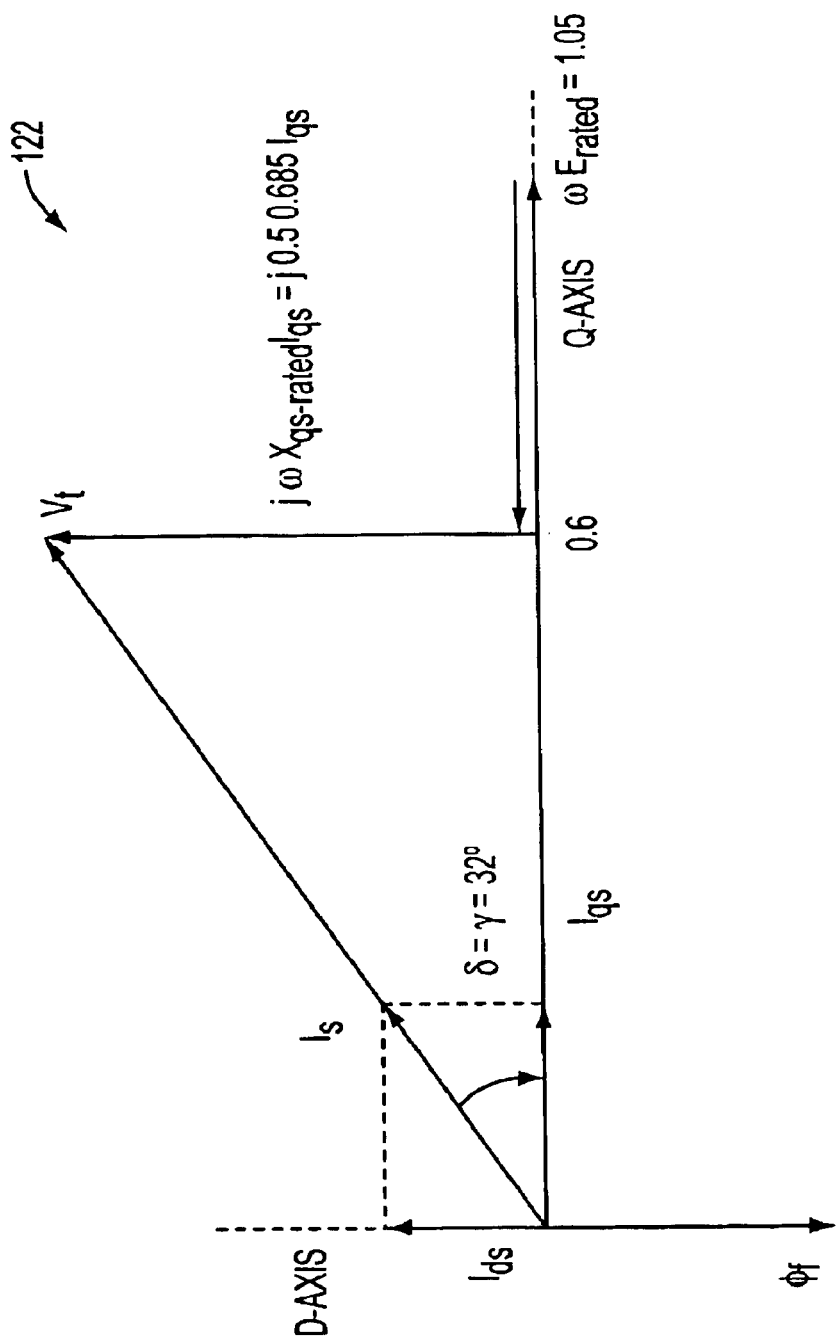
FIG. 2 is a vector diagram illustrating an example of the starting system of FIG. 1 for a saturated S/G application, according to an embodiment of the present invention.
Figure 3:
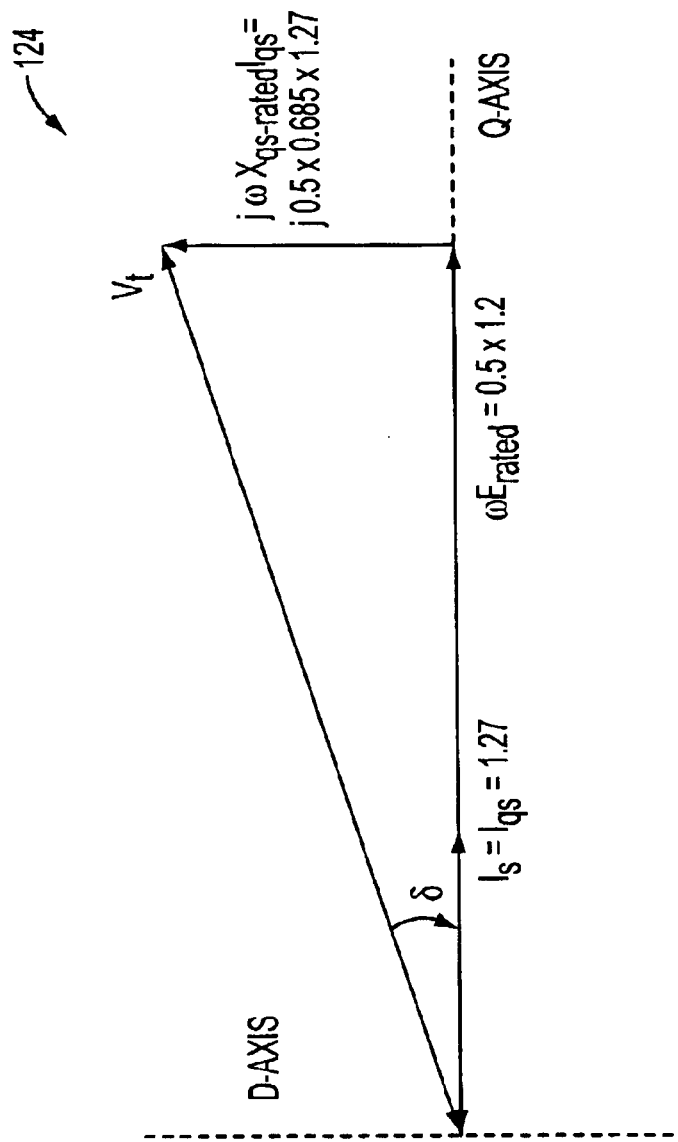
FIG. 3 is a vector diagram illustrating an example of a prior art starting system for a saturated S/G application, for purposes of comparison with FIG. 2.

For the following discussion, reference will be made to FIGS. 1 and 2, and as necessary, attention will be drawn to a particular figure. FIG. 2 is a vector diagram of the starting system (100) of FIG. 1 for a saturated case in accordance with an embodiment of the present invention, and FIG. 3 is a vector diagram of a prior art starting system of FIG. 1 for a saturated case used for comparison.

In a first embodiment of the present invention as shown in the vector diagram (122) of FIG. 2, the terminal voltage Park vector ($V_t$) may be maintained at an angle identical to the armature current Park vector ($I_s$). The control system to implement this requires the current Park vector applied to the armature winding (102A) of the main machine (102) to be maintained at a fixed angle. One example of such a control system is presented in FIG. 4 and discussed in greater detail below.

Figure 4:
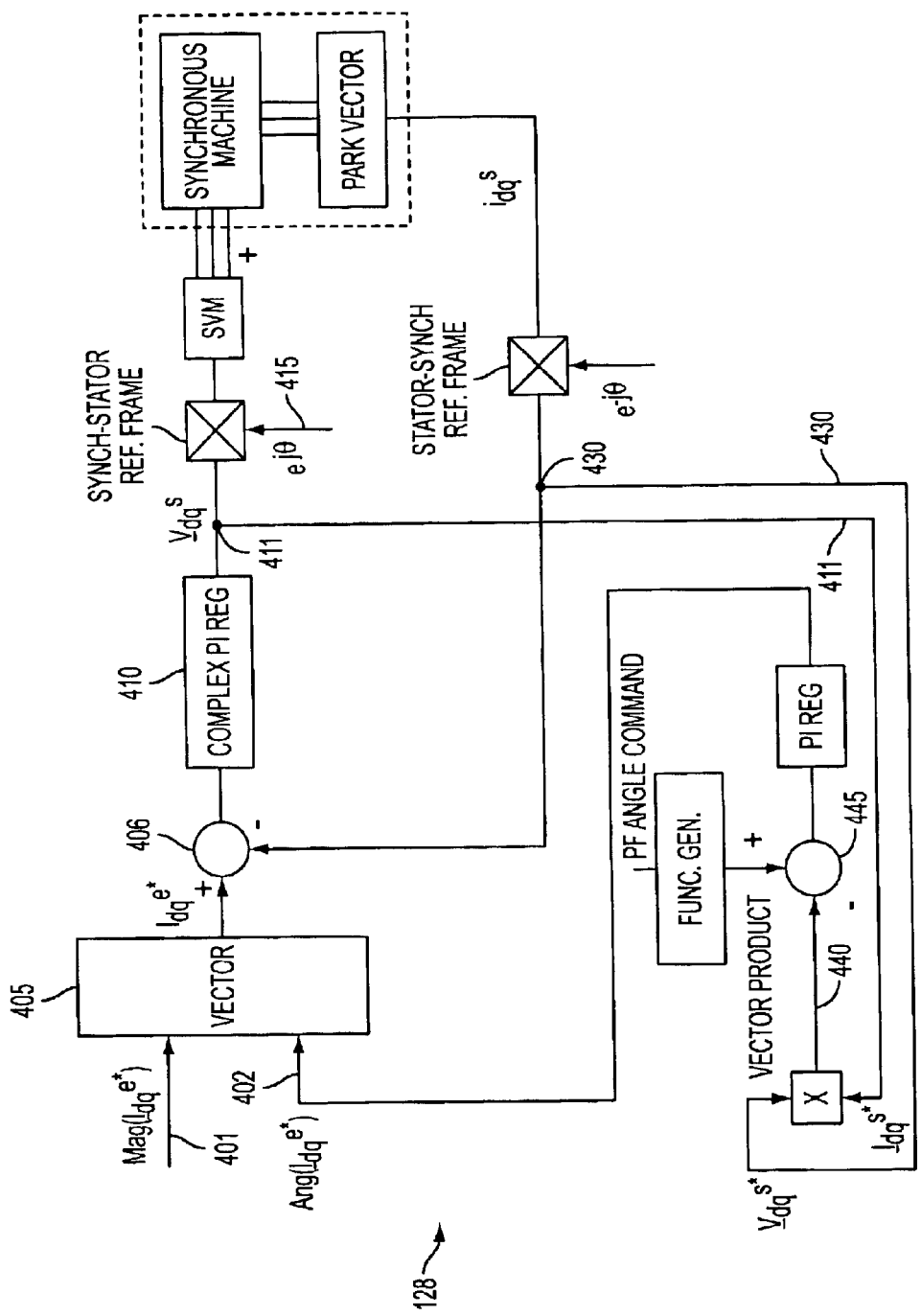
FIG. 4 is a block diagram illustrating an example of a control option for excitation for the main machine in FIG. 1.

To aid in the understanding of the block diagram of FIG. 4, reference is made to Park Vectors. Referring now to FIG. 2, a Park vector representation of electrical current, i.e., a stator current vector, is shown as an example to illustrate the transformation of the Park vector representation of the stator current vector between stationary and moving, or synchronous, reference frames. Although the stator current vector is used to illustrate the present example, any measurable vector quantity associated with any suitable electrical machine could be used, such as voltages or magnetic fluxes, for example. A voltage controller using Park vectors for eliminating a rotor position sensor is disclosed in U.S. Pat. No. 6,301,136, referenced above.

FIG. 2 shows a stationary reference frame, i.e., a reference frame that is fixed in space relative to the electrical machine in the present example. The stationary reference frame comprises real axis at rest 202 and imaginary axis at rest 204. FIG. 2 also shows a moving reference frame, which may be a synchronous reference frame, i.e. a reference frame that moves at the same speed and in synchronization with the rotor of the associated electrical machine, comprising real axis moving 206 and imaginary axis moving 208. As seen in FIG. 2, the moving reference frame is rotated from the stationary reference frame by transformation angle θ 210. Also as seen in FIG. 2, the moving reference frame is rotating with respect to the stationary reference frame at an angular speed ω 212. Thus, if angular speed ω 212 is known, transformation angle θ 210 can be calculated from angular speed ω 212 using equation (1):

$$\theta = \theta_0 + \int \bar{\omega} dt \quad (1)$$

where $\theta_0$ is the initial position of the moving reference frame at time t=0. In other words, transformation angle θ can be approximated, or estimated, by integrating an estimated angular speed of the moving reference frame. In the case of a synchronous reference frame, the estimated angular speed of the synchronous reference frame is the estimated angular speed of the rotor of the electrical machine.

In the present example, Park vector $\vec{i}_S$ 214 represents the current as a vector in space, and may be referred to as the space vector of the winding current. As seen in FIG. 2, the position of Park vector $\vec{i}_S$ 214 can be given relative to, either the stationary or the moving reference frame. Using a three phase electrical machine, as in the present example, Park vector $\vec{i}_S$ 214 can be determined from the three stator winding current scalar quantities $i_a$, $i_b$, and $i_c$, which are the electric currents in each of the three individual stator windings of the three phase electric machine. Measurement of the scalar quantities $i_a$, $i_b$, and $i_c$ can be obtained, for example, using appropriate sensors or measuring devices as known in the art. For a three phase electrical machine, Park vector $\vec{i}_S$ 214 is defined in equation (2) as:

$$\vec{i}_s = \frac{2}{3}(i_a + \vec{a}i_b + \vec{a}^2 i_c) \quad (2)$$

where $\vec{a}$ is the spatial relationship of the stator windings within the machine. For a three phase machine, as in the present example, $\vec{a}$ is the complex number $$\vec{a} = -\frac{1}{2} + j\sqrt{\frac{3}{2}} = e^{j\frac{2\pi}{3}}$$

viewed as a vector in the complex plane and $\vec{a}^2$ is the complex number $$\vec{a}^2 = -\frac{1}{2} - j\sqrt{\frac{3}{2}} = e^{-j\frac{2\pi}{3}}$$

viewed as a vector in the complex plane.

As seen in FIG. 2, angle α 216 describes the position of Park vector $\vec{i}_S$ 214 relative to the stationary reference frame comprising real axis at rest 202 and imaginary axis at rest 204. Thus, Park vector $\vec{i}_S$ 214 can be represented in the stationary reference frame using polar coordinates as shown in equation (3) as:

$$\vec{i}_s = i_s e^{j\alpha} \quad (3)$$

where $i_s$ is the amplitude, or length, of Park vector $\vec{i}_S$ 214. As seen in FIG. 2, angle α 216 minus transformation angle θ 210 describes the position of Park vector $\vec{i}_S$ 214 relative to the moving reference frame, which may be a synchronous reference frame, comprising real axis moving 206 and imaginary axis moving 208. Thus, Park vector $\vec{i}_S$ 214 can be represented in the moving, or rotating, reference frame using polar coordinates as shown in equation (4):

$$\vec{i}_s{}^r = i_s e^{j(\alpha-\theta)} = \vec{i}_s e^{-j\theta} \quad (4)$$

where, again, $i_s$ is the amplitude, or length, of Park vector $\vec{i}_S$ 214, which is Park vector $\vec{i}_S{}^r$ in the rotating, i.e., moving, or synchronous reference frame. The second equality in equation (4) shows that transformation of Park vector coordinates from a stationary frame to a synchronous (rotating) frame is effected by multiplying the stationary frame Park vector by the complex number $e^{-j\theta}$, i.e. rotating the stationary frame Park vector through the negative of the angle θ, to obtain the synchronous frame Park vector. The complex number $e^{-j\theta}$ may also be written as exp(-jθ).

Referring to FIG. 4, which presents the block diagram 128 for controlling the current and terminal voltage of the synchronous machine, the magnitude of the current vector and the computed angle 402, are combined and transformed to Cartesian co-ordinates 405, and represent the current vector command for the current loop in the synchronous co-ordinate system. The reference is compared to the current feedback in synchronous co-ordinate system 406, and operated upon by the complex PI regulator 410, the output of which 411, represents the desired terminal voltage in the synchronous reference frame. This signal is multiplied by exp(-jθ),415, and transferred to the space vector logic block that computes the relevant duty cycles for the inverter.

The current vector is computed in the stationary reference frame, converted to the synchronous reference frame 430, and used as the feedback current vector. The angle 402 of the current vector is computed by first taking the vector cross product 430, of the terminal and current vectors, 411 and 430 and comparing the result 440, to power factor angle in comparator 445. The error is operated upon by the PI regulator, and the resultant signal represents the appropriate angle 402 for the command.

Examples of results are shown in FIGS. 2 and 3. As known to those skilled in the art, saturation occurs where no further increase in flux density will result in appreciable increased magnetizing forces within the S/G. In an embodiment of the present invention shown in FIG. 2, the S/G (102) is saturated, and the armature current Park vector is controlled to be in-phase with the terminal voltage Park vector $V_t$. Where ω=0.5 pu, the armature current Park vector is adjusted to introduce a d-axis armature current value which nulls, or minimizes the saturation level of the d-axis resultant flux. The plural phase rectifier (118) providing the voltage to the field winding (102A) of the main generator S/G (102) is controlled to command the voltage Park vector $V_t$ to adjust the relative angle between the voltage Park vector $V_t$ and the armature current Park vector $I_s$, with respect to the d-axis component of the armature current. The control of the armature current Park vector $I_s$ as shown in FIG. 2 results in the d-axis armature flux canceling a portion of the field flux. Therefore the resultant flux on the d-axis is less saturated due to the demagnetization effect of the d-axis armature current.

In FIG. 2, the resulting torque T of the main S/G (102) where the armature current Park vector of S/G (102) is controlled to be in-phase with the terminal voltage Park vector is shown. The torque value T is 18% higher in this first embodiment of the present invention relative to the prior art control method described below.

As shown above, the controlled introduction of a d-axis component of the armature current into the main S/G (102) can be used to demagnetize the d-axis resultant flux and enable the machine to generate more torque when used in start-up applications. Once implemented, the synchronous machine produces more torque per amp during engine start-up.

In an example of the prior art method shown in the vector diagram 124 of FIG. 3, the S/G (102) is saturated. The following results may be achieved where the main S/G (102) is saturated and the traditional method of controlling the armature current Park vector of the synchronous machine to remain in-phase with the back-emf vector, which optimizes the machine (102).

For the following discussion, reference will be made to FIGS. 1 and 3, and as necessary, attention will be drawn to a particular figure. FIG. 3 is a vector diagram of the prior art starting system applied to a saturated case.

In the prior art control method described below, the armature current Park vector $I_s$ is controlled to be in-phase with the back-emf vector, rather than with the terminal voltage Park vector $V_t$ as in the first embodiment of the present invention. The result is an angle between the armature current Park vector and the terminal voltage Park vector. In the vector diagram shown in FIG. 3, the armature current magnitude is 1.27 pu, the back-emf is saturated at 1.2 pu at full rated field, and ω=0.5 pu.

The resulting torque T of the main S/G (102) where the armature current vector 1 is controlled to be in-phase with the back-emf vector is 18% less than that achievable with the first embodiment of FIG. 2. Additionally, the example of FIG. 2 may be implemented regardless of S/G (102) saturation levels.

Where the S/G (102) is saturated, the embodiment of the present invention described above maximizes the utilization of both the rating of the synchronous machine (102) and the inverter (110) of the armature winding (102A). Where the S/G (102) is not saturated, this solution still maximizes the utilization of the inverter (110) of the armature winding (102A). Therefore the desired results are achieved regardless of saturation levels. As a consequence, significant savings can be obtained not only utilizing the electromagnet better, but also reducing the kVA rating of the power converter for the armature of the main generator.

As shown in the vector diagram (122) of FIG. 2, the terminal voltage Park vector ($V_t$) may be maintained at an angle identical to the armature current Park vector ($I_s$). The control system to implement this requires the current vector applied to the armature winding (102A) of the main machine (102) to be maintained at a fixed angle. In a second embodiment of the present invention, the armature current Park vector ($I_s$) may slightly lag or lead the terminal voltage Park vector ($V_t$), sacrificing power electronic optimization levels for power factor control or other benefits. Such benefits can include an operation best mode for a given speed or where terminal voltage is at a maximum level. In such cases, the exciter (104) may be adjusted to allow the current Park vector ($I_s$) to slightly lead the terminal voltage Park vector ($V_t$).

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of starting and operating a prime mover to improve power electronics utilization, said method comprising:

controlling a kVA utilization plural phase inverter to provide a voltage signal to an armature winding of a starter/generator, said voltage signal having a terminal voltage Park vector and a current Park vector, said current Park vector comprising a q-axis and a d-axis current vector component;

controlling said terminal voltage Park vector to adjust an angle value between said terminal voltage Park vector and said armature current Park vector, wherein said armature current is provided a d-axis current vector component to reduce a saturation level of said d-axis; and wherein at least a first angle value is provided by controlling said terminal voltage Park vector to be substantially in-phase with said current vector component of said armature current Park vector while reducing said saturation level of said d-axis to improve power electronics utilization provided by said starter/generator.

2. A method of starting and operating a prime mover to improve power electronics utilization as claimed in claim 1, wherein said first angle value between said terminal voltage Park vector and said armature current Park vector is adjustable to maintain said current vector component substantially in-phase with said terminal voltage Park vector while reducing said saturation level of said d-axis.

3. A method of starting and operating a prime mover to improve power electronics utilization as claimed in claim 1, wherein a second angle value between said terminal voltage Park vector and said armature current Park vector is adjustable to maintain said vector component slightly leading said terminal voltage Park vector while reducing said saturation level of said d-axis.

4. A method of starting and operating a prime mover to improve power electronics utilization as claimed in claim 1, wherein said main starter/generator comprises a salient-pole synchronous generator electrically coupled with said kVA utilization plural phase inverter.

5. An apparatus for starting and operating a prime mover, such as a starter/generator having an armature and field winding, to improve power electronics utilization, comprising:

a plural phase inverter electrically coupled to a starter/generator to provide a voltage signal to said armature winding of said starter/generator, said voltage signal having a terminal voltage Park vector and a current Park vector, said current Park vector comprising a q-axis and a d-axis current vector component; and said plural phase inverter having a utilization control mode to adjust an angle value between said terminal voltage Park vector and said armature current Park vector, wherein said armature current is provided a d-axis current vector component to reduce a saturation level of said d-axis;

wherein at least a first angle value is provided by controlling said terminal voltage Park vector to be substantially in-phase with said current vector component of said armature current Park vector while reducing said saturation level of said d-axis to improve power electronics utilization provided by said starter/generator.

6. An apparatus for starting and operating a prime mover to improve power electronics utilization as claimed in claim 5, wherein said plural phase inverter having said utilization control mode provides said first angle value that is adjustable to maintain said current vector component substantially in-phase with said terminal voltage Park vector while reducing said saturation level of said d-axis.

7. An apparatus for starting and operating a prime mover to improve power electronics utilization as claimed in claim 5, wherein said plural phase inverter having said utilization control mode provides a second angle value that is adjustable to maintain said vector component slightly leading said terminal voltage Park vector while reducing said saturation level of said d-axis.

8. An apparatus for starting and operating a prime mover to improve power electronics utilization as claimed in claim 5, wherein said main starter/generator comprises a salient-pole synchronous generator electrically coupled with said plural phase inverter having said utilization control mode.

9. A method of starting and operating a prime mover to improve power electronics utilization as claimed in claim 1, wherein a third angle value between said terminal voltage Park vector and said armature current Park vector is adjustable to maintain said current vector component slightly lagging said terminal voltage Park vector.

10. A method of starting and operating a prime mover to improve power electronics utilization as claimed in claim 1, further comprising the step of providing a floating frame controller to control said kVA utilization plural phase inverter.

11. An apparatus for starting and operating a prime mover to improve power electronics utilization as claimed in claim 5, wherein said plural phase inverter having said utilization control mode provides a third angle value that is adjustable to maintain said current vector component slightly lagging said terminal voltage Park vector.

12. An apparatus for starting and operating a prime mover to improve power electronics utilization as claimed in claim 5, further comprising at least one of a sensor and sensorless floating frame controller to control said plural phase inverter having said utilization control mode.

* * * * *

UNITED STATES PATENT AND TRADEMARK OFFICE
CERTIFICATE OF CORRECTION

PATENT NO. : 6,791,204 B2  
DATED : September 14, 2004  
INVENTOR(S) : Bulent Sarlioglu and Colin E. Huggett Page 1 of 1

It is certified that error appears in the above-identified patent and that said Letters Patent is hereby corrected as shown below:

<u>Title page,</u>
Item [75], Inventors, should read
-- Bulent Sarlioglu, Torrance, CA --

Signed and Sealed this

Twenty-sixth Day of April, 2005

JON W. DUDAS
*Director of the United States Patent and Trademark Office*